US006690315B1

(12) United States Patent
Schamus et al.

(10) Patent No.: US 6,690,315 B1
(45) Date of Patent: Feb. 10, 2004

(54) QUADBIT KERNEL FUNCTION ALGORITHM AND RECEIVER

(75) Inventors: John J. Schamus, Lebanon, OH (US); James B. Y. Tsui, Dayton, OH (US); William S. McCormick, Centerville, OH (US); John M. Emmert, Centerville, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/354,267

(22) Filed: Jan. 31, 2003

(51) Int. Cl.$^7$ ................................................. G01S 7/40
(52) U.S. Cl. .......................... 342/13; 342/20; 342/175; 342/195; 342/196
(58) Field of Search ......................... 342/13–20, 89–90, 342/175, 192, 193–197; 708/7, 209, 270, 403, 404

(56) References Cited

U.S. PATENT DOCUMENTS

| | | | |
|---|---|---|---|
| 3,730,425 A | | 5/1973 | Kindell et al. |
| 4,064,400 A | * | 12/1977 | Akushsky et al. .......... 708/491 |
| 5,793,323 A | | 8/1998 | Tsui |
| 5,903,483 A | * | 5/1999 | Bond et al. ................. 708/403 |
| 5,917,737 A | * | 6/1999 | Tsui et al. .................. 708/403 |
| 5,963,164 A | * | 10/1999 | Tsui et al. .................. 342/196 |
| 6,310,575 B1 | * | 10/2001 | Chabah et al. .............. 342/162 |
| 6,448,921 B1 | | 9/2002 | Tsui et al. |
| 6,531,976 B1 | * | 3/2003 | Yu ............................... 342/16 |
| 2003/0038742 A1 | * | 2/2003 | Greer ........................... 342/13 |

OTHER PUBLICATIONS

McCormick et al, "Tribit Radio Receiver with Enhanced Kernel Function Value Realization and Increased Instantaneous Dynamic Range", U.S. patent application Ser. No. 09/944,616, filed Sep. 4, 2001.
Tsui et al., "Digital Filter Bank Followed by Monobit Receivers for Signal Processing", U.S. patent application Ser. No. 10/008,476, filed Dec. 10, 2001.
Tsui, "Microwave Receivers with Electronic Warfare Applications", copyright 1986, John Wiley and Sons.
Phister, Jr., "Logical Design of Digital Computers" copyright 1958, John Wiley and Sons.
Bartee, "Digital Computer Fundamentals", copyrights 1960, 1966, 1972, McGraw–Hill Incorporated.

* cited by examiner

Primary Examiner—Thomas H. Tarcza
Assistant Examiner—Isam Alsomiri
(74) Attorney, Agent, or Firm—Gerald B. Hollins; Thomas L. Kundert

(57) ABSTRACT

A Fourier transformation system usable for example in an electronic warfare radio receiver for analyzing spectral content of multiple transmitter-sourced brief duration incoming signals for characteristics including frequency component and frequency component amplitude content. The Fourier transformation system includes a plurality of approximated Kernel function values disposed at a plurality of locations about a real-imaginary coordinate axis origin and displaced from the origin by magnitudes having real and imaginary component lengths of unity and powers of two. Multiplication involving a power of two component during a Fourier transformation are achieved in a simple manner commensurate with a multiplication by unity in complexity but involving a binary number shift multiplication operation in lieu of a full fledged digital multiplication. Signal results comparisons with more simplified and more complex Kernel function approximations are also included.

20 Claims, 14 Drawing Sheets

| Conventional | | | Binary | | |
|---|---|---|---|---|---|
| Input | Multiplied by | Results | Input | Multiplied by | Results |
| 3 | 2 | 6 | 11 | 2 | 110 |
| 3 | 4 | 12 | 11 | 4 | 1100 |
| 3 | 8 | 24 | 11 | 8 | 11000 |

QUADBIT KERNEL FUNCTION ALGORITHM AND RECEIVER

RIGHTS OF THE GOVERNMENT

The invention described herein may be manufactured and used by or for the Government of the United States for all governmental purposes without the payment of any royalty.

BACKGROUND OF THE INVENTION

In a series of previously issued and pending U.S. Patent documents several of the inventors named in connection with the present document have disclosed a family of electronic warfare radio receivers usable in obtaining militarily and otherwise useful information from an incoming microwave frequency radio signal including significant components of such receivers. Early in this sequence of patent documents the name "monobit receiver" was used in referring to one embodiment of such a receiver and subsequently as a generic or family name for such receivers. Each of these receivers as preferably embodied has the attribute of employing a simplified multiplication in using the included Fourier transformation function in order that a simple and low cost realization of the receiver can be achieved.

In each of these simplified multiplications the Kernel function portion of the Fourier transformation is represented by a unit value, a magnitude of one or near one, in order to avoid the mechanization of a full fledged complex number multiplication algorithm. In fully implemented arrangements of such multiplications complex numbers representing an input signal are multiplied by a second set of complex numbers representing a Fourier transformation Kernel function. Generally the simplified multiplications have in our inventions in the past been accomplished by insuring the second set of complex numbers involve real and imaginary values of unity or near unity magnitude. As implied by the name "monobit receiver" the earliest of these simplified Kernel function receivers employs a Kernel function approximation representable by a single binary bit of information while the later versions of the receiver and indeed the present invention involve Kernel function approximations requiring a greater number of bits, i.e., three or four, for their representation. These later receivers also observe the concept that some form of simplified and readily accomplished multiplication is required for practical reasons.

Fourier transformation Kernel functions of unit magnitude or substantially unit magnitude may therefore be used successfully to approximate a true Kernel function value and enable the realization of a Fourier transformation using only multiplication by unity or in essence no multiplication in the Fourier transformation computation algorithm. Kernel function realization in this manner,is first disclosed in a U.S. Patent of Tsui et al., numbered U.S. Pat. No. 5,917,737, a patent wherein Kernel function values are located on a circle of unit radius at angular locations of $\pi/4$, $3\pi/4$, $5\pi/4$ and $7\pi/4$ radians i.e., at locations displaced by forty-five degrees from the real and imaginary axes of a coordinate axis plot. Actual coordinate axis locations of 1+j, 1−j, −1+j and −1+j are used for the Kernel functions disclosed in the U.S. Pat. No. 5,917,737 patent.

Our U.S. Pat. No. 5,793,323 relates to the U.S. Pat. No. 5,917,737 patent in that it discloses an integrated circuit chip arrangement for a monobit receiver employing the approximated Kernel function of the U.S. Pat. No. 5,917,737 patent. This patent also discloses several implementation compromises possible in applying the simplified Kernel function to receiver apparatus.

Our U.S. Pat. No. 6,448,921 also relates to the U.S. Pat. No. 5,917,737 patent in that it discloses the use of a monobit receiver in combination with several bandpass filters in order to increase the number of simultaneously processable signals and enhance the dynamic range capability of the overall system.

The invention of our U.S. patent application of Ser. No. 09/944,616, filed on Sep. 4, 2001, provides a straightforward approach to the enhancement of dynamic range in a monobit family receiver by increasing the number of Kernel function locations used in the Kernel function approximation from the four locations of the U.S. Pat. No. 5,917,737 patent and the U.S. Pat. No. 5,963,164 patent to eight locations. In the application of Ser. No. 09/944,616 Kernel function values located at the $\pi/4$, $3\pi/4$, $5\pi/4$ and $7\pi/4$ radian locations are added to the Kernel function values at 0, $\pi/2$, $\pi$, and $3\pi/2$ radians with the added four values being slightly increased in magnitude from true unit circle values and in fact having a magnitude of $(2)^{1/2}$ or 1.414. Some of these eight location Kernel function values depart slightly from unity magnitude, however, the overall results of the eight-location Kernel function appear favorable.

The invention of our U.S. patent application Ser. No. 10/008,476, filed on Dec. 10, 2001, also relates to the monobit receiver family in that it discloses a receiver from this family applied to a signal source locating or direction finding usage. The eight point Kernel function approximation of the type disclosed in the Ser. No. 09/944,616 application is also used in the invention of this Ser. No. 10/008, 476 application.

Again a significant deficiency in the monobit receiver is that the instantaneous dynamic range achieved by the receiver is undesirably low. The instantaneous dynamic range relates to the receiver's capability to detect two simultaneous signals of different amplitude. Because of the non-linear property of the approximated Kernel function in the original Tsui et al. U.S. Pat. No. 5,917,737 patent receiver, the instantaneous dynamic range of this receiver is limited to about 5 dB. Using a different Kernel function in the later tribit receiver of the Ser. No. 09/944,616 application can improve this instantaneous dynamic range to about 10 dB. However, one of the key concepts in the monobit and tribit receivers is that there is no multiplication accomplished in performing the fast Fourier transform of either receiver. Each of the patent documents identified in this BACKGROUND OF THE INVENTION discussion is hereby incorporated by reference herein.

The present patent document continues in this line of monobit and tribit, for example, receiver patents and provides additional insight into the unit magnitude and other approximated Kernel function realization. The present document also provides performance based comparative evaluations of receivers achieved with the Kernel function approximations disclosed in the identified prior patent documents and provides a current knowledge estimate of where the practical end points for this series of Fourier transformation Kernel function approximations and the associated receivers lies.

SUMMARY OF THE INVENTION

The present invention provides improved instantaneous dynamic range for the monobit and tribit receivers through Kernel function modification. The invention provides additional usable Kernel function values through a simplified form of multiplication involving the binary shift function.

It is therefore an object of the present invention to provide electronic warfare receivers of the monobit and tribit types having improved dynamic range characteristics.

It is another object of the invention to provide an additionally improved approximation of the Kernel function used in an electronic warfare receiver.

It is another object of the invention to provide an increased number of Kernel function values usable in an approximated Kernel function simplified multiplication electronic warfare receiver.

It is another object of the invention to provide an optimized approximated Kernel function electronic warfare radio receiver.

It is another object of the invention to provide a new set of approximated Kernel function values that are based on the binary shift multiplication algorithm.

It is another object of the invention to provide a sixteen-point approximated Kernel function usable with simplified forms of mathematical multiplication in an electronic warfare receiver.

It is another object of the invention to provide a sixteen-point simplified multiplication Kernel function quadbit electronic warfare receiver.

These and other objects of the invention will become apparent as the description of the representative embodiments proceeds.

These and other objects of the invention are achieved by the limited complexity method of analyzing input radio frequency signals, said method comprising the steps of:

generating an approximated Fourier transformation of successive segments of said input radio frequency signals;

said approximated Fourier transformation including individual Fourier series terms having real magnitude and imaginary magnitude coefficients generated by multiplication of input signal determined coefficients by selected approximated Fourier transformation Kernel function coefficients;

said selected approximated Fourier transformation Kernel function coefficients having magnitudes of unity and of two raised to an exponential power;

generating said individual Fourier series terms from said input signal determined coefficients and from said Fourier transformation Kernel function coefficients having real magnitude and imaginary magnitude coefficients of two raised to an exponential power using a bit shift multiplication algorithm; and discriminating between spurious, approximated Fourier transformation-sourced and valid, input signal sourced components in a Fourier transformation output signal.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

The approximated Kernel function for the first of the above-identified patents, the four valued Kernel function of the U.S. Pat. No. 5,917,737 patent of Tsui et al., is shown in graphic representation in the FIG. 1 drawing herein. The monobit receiver using this Kernel function employs a single bit concept in implementing the discrete Fourier transform (DFT) of the receiver in order to eliminate the implementation of a true complex multiplication in the receiver's realization. Therefore, one of the key concepts in designing the monobit and tribit receivers is that there is no multiplication in performing the fast Fourier transform (FFT). Only additions are used in the DFT transform. A receiver according to this arrangement has, in fact, been implemented and fabricated in an application specific integrated circuit (ASIC) chip in applicants' laboratory. The performance of a receiver of this arrangement has thus been successfully demonstrated. This single chip receiver provides an instantaneous bandwidth of 1.25 GHz and performs a 256-point DFT every 102.4 ns. This ASIC chip additionally includes arbitration logic and determines the number of input signals and their frequencies. The encoding logic of the receiver identifies the highest two amplitudes from a total of 128 (256/2) frequency outputs.

As indicated above however, the dynamic range of this monobit receiver is undesirably limited to signal strength differences in the range of 5 dB. This dynamic range limitation can be primarily attributed to the non-linear property of the Kernel function realization. In some receiver applications of course, this limited dynamic range is acceptable and use of the single chip monobit receiver is thus desirable.

Figure 1:
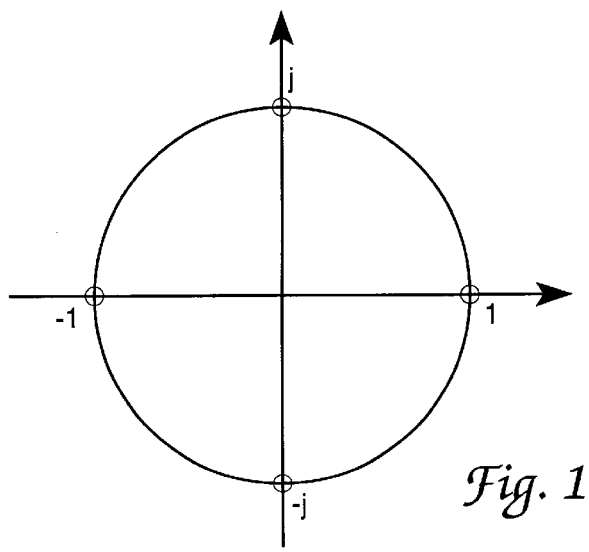
FIG. 1 shows a four-point monobit receiver Kernel function approximation.
Figure 2:
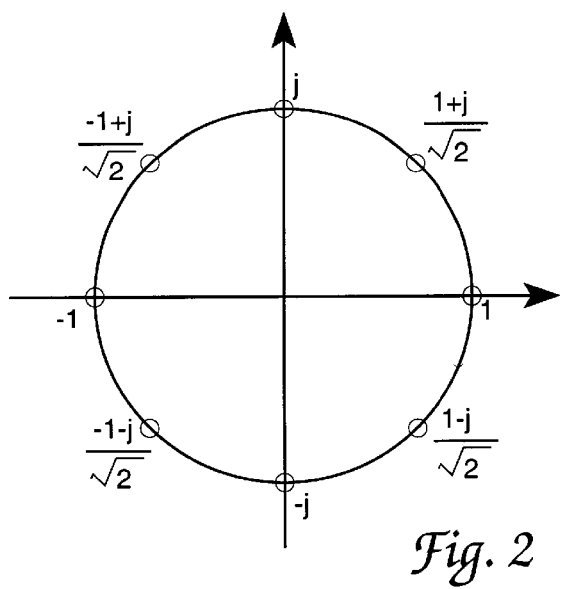
FIG. 2 shows an eight-point unit circle monobit receiver Kernel function approximation requiring non-simplified multiplication.
Figure 3:
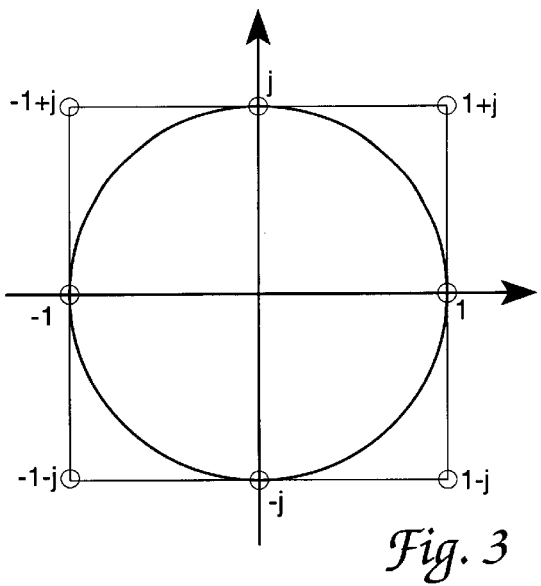
FIG. 3 shows an eight-point unit circle tribit receiver Kernel function approximation enabling simplified multiplication.

In FIG. 2 the conventional 8 Kernel function location points for one possible improvement to the FIG. 1 Kernel function and its associated monobit receiver are shown. The eight Kernel function values in the FIG. 2 drawing are each disposed on a circle of unit value radius. Unfortunately in order to use the four Kernel function values having the amplitude of $1/\sqrt{2}$ ($\pm 1\pm j)\sqrt{2}$ in FIG. 2 there is need for performing full-fledged complex number multiplications. Thus, the FIG. 2 selection of Kernel function values can not be used in receivers of the monobit and related types. The eight value Kernel function approximation associated with the tribit receiver of the Ser. No. 09/944,616 patent application in the above listing of patent documents is shown in graphic form in the FIG. 3 drawing. In these Kernel function approximations only magnitudes of 1 and j are present, thus, no multiplication is needed and the tribit receiver is available as a possible improvement to the undesirably limited dynamic range performance of the FIG. 1 related monobit receiver. With use of the FIG. 3 Kernel function, the instantaneous dynamic range of a tribit electronic warfare receiver is improved to about 10 dB.

Figure 4:
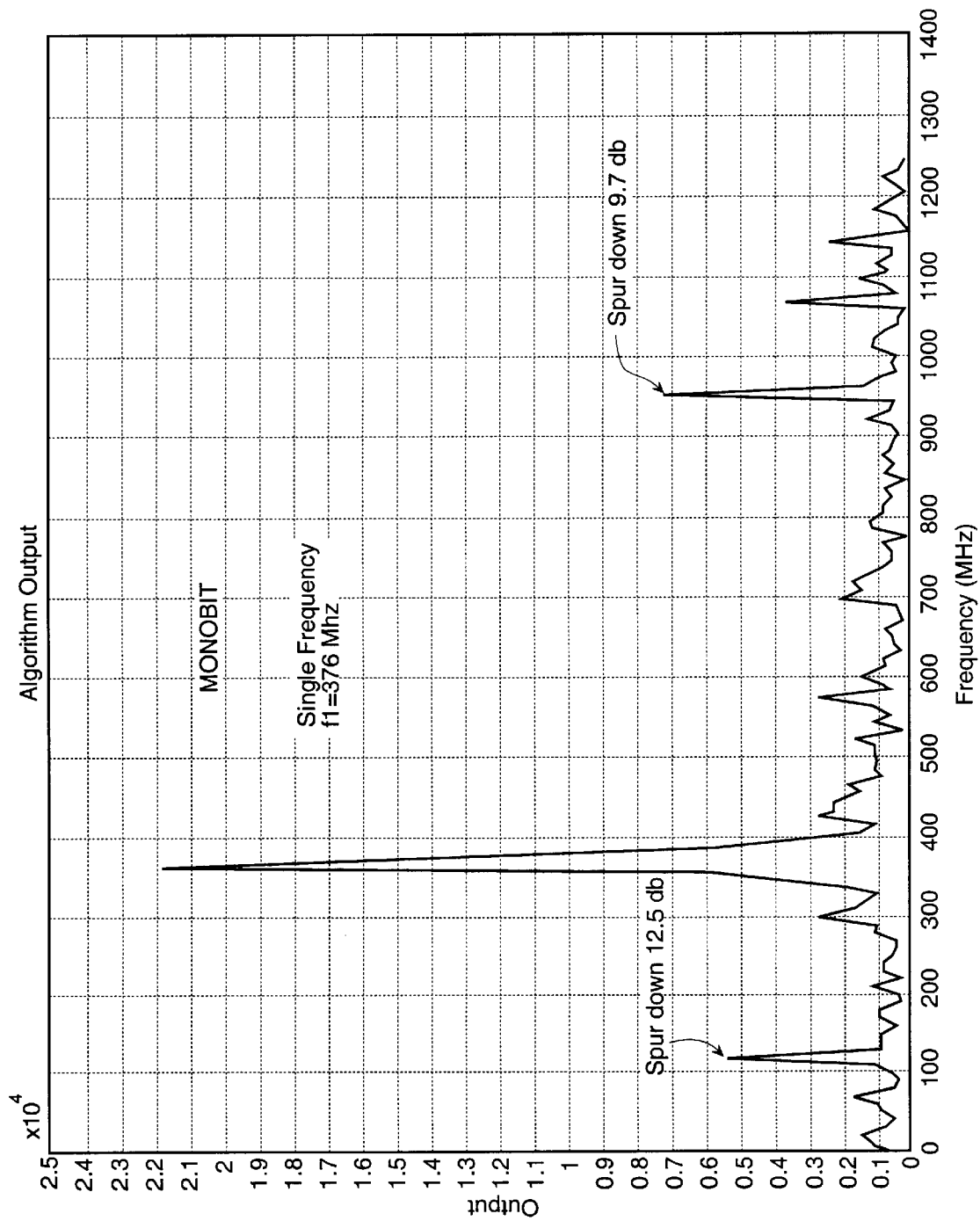
FIG. 4 shows a simulated monobit receiver response to a single signal input.

Several signal amplitude relationships with respect to frequency for monobit and tribit receivers are shown in FIGS. 4 through 7 of the drawings herein. These relationships originate with simulated signals and are presented here as an aid to appreciating the performance of the receiver of the present invention. FIG. 4 in this group shows the monobit receiver response to an input of a single signal located at 375 Megahertz. In this instance a spurious response near 945 Megahertz is generated; this response is, however, about 9.7 dB below the main signal response.

Figure 5:
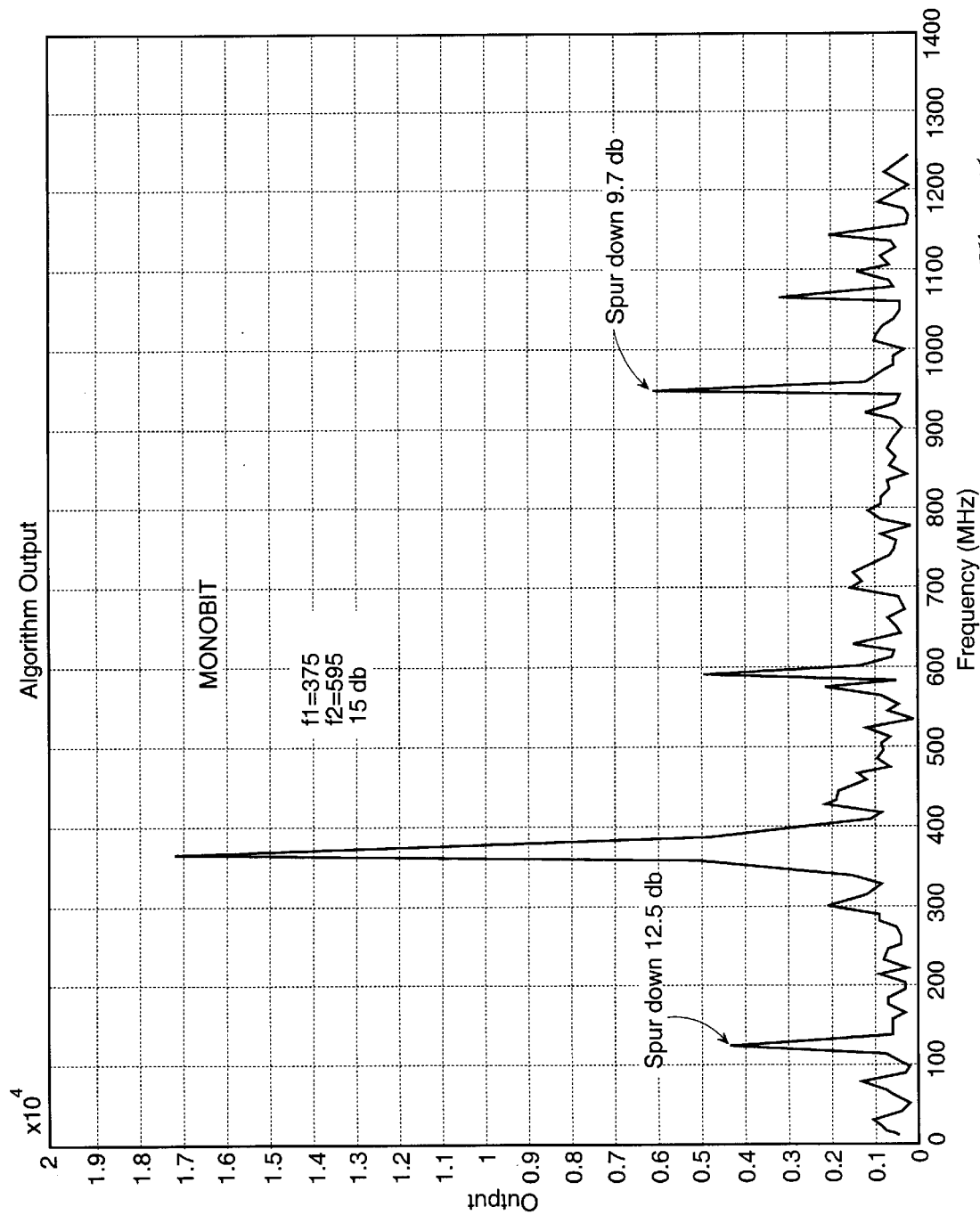
FIG. 5 shows a simulated monobit receiver response to a pair of input signals.

FIG. 5 shows the FIG. 4 monobit receiver response with an input of two unequal amplitude signals. In FIG. 4 the second signal at 595 megahertz is 15 dB below the main signal. At the output of the receiver the 595 megahertz second signal is moreover below the level of the system spurious response at about 945 megahertz, therefore the second signal is not detectable and a difficulty with the monobit receiver and the FIG. 1 Kernel function approximation is illuminated.

Figure 6:
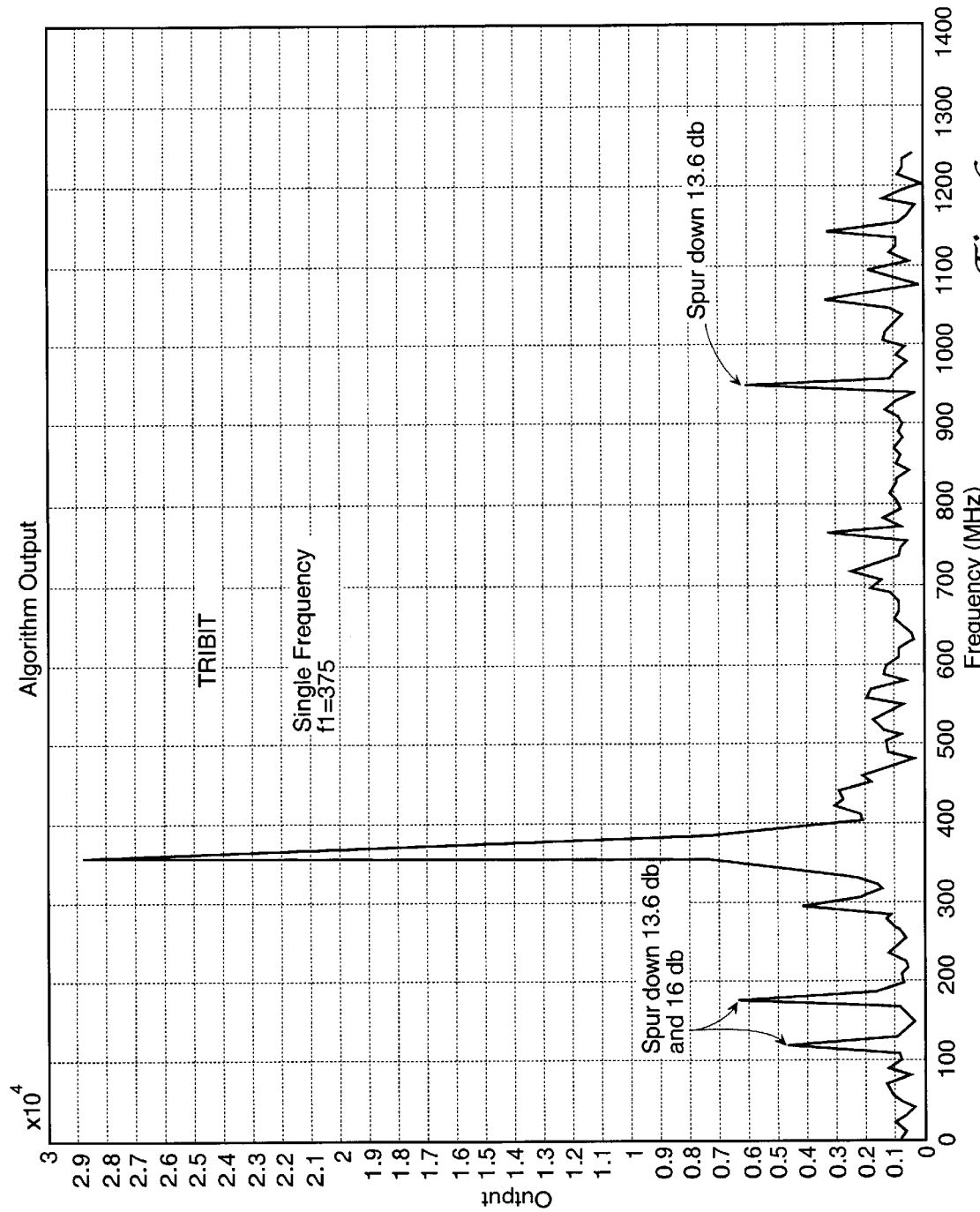
FIG. 6 shows a simulated tribit receiver response to a single signal input.
Figure 7:
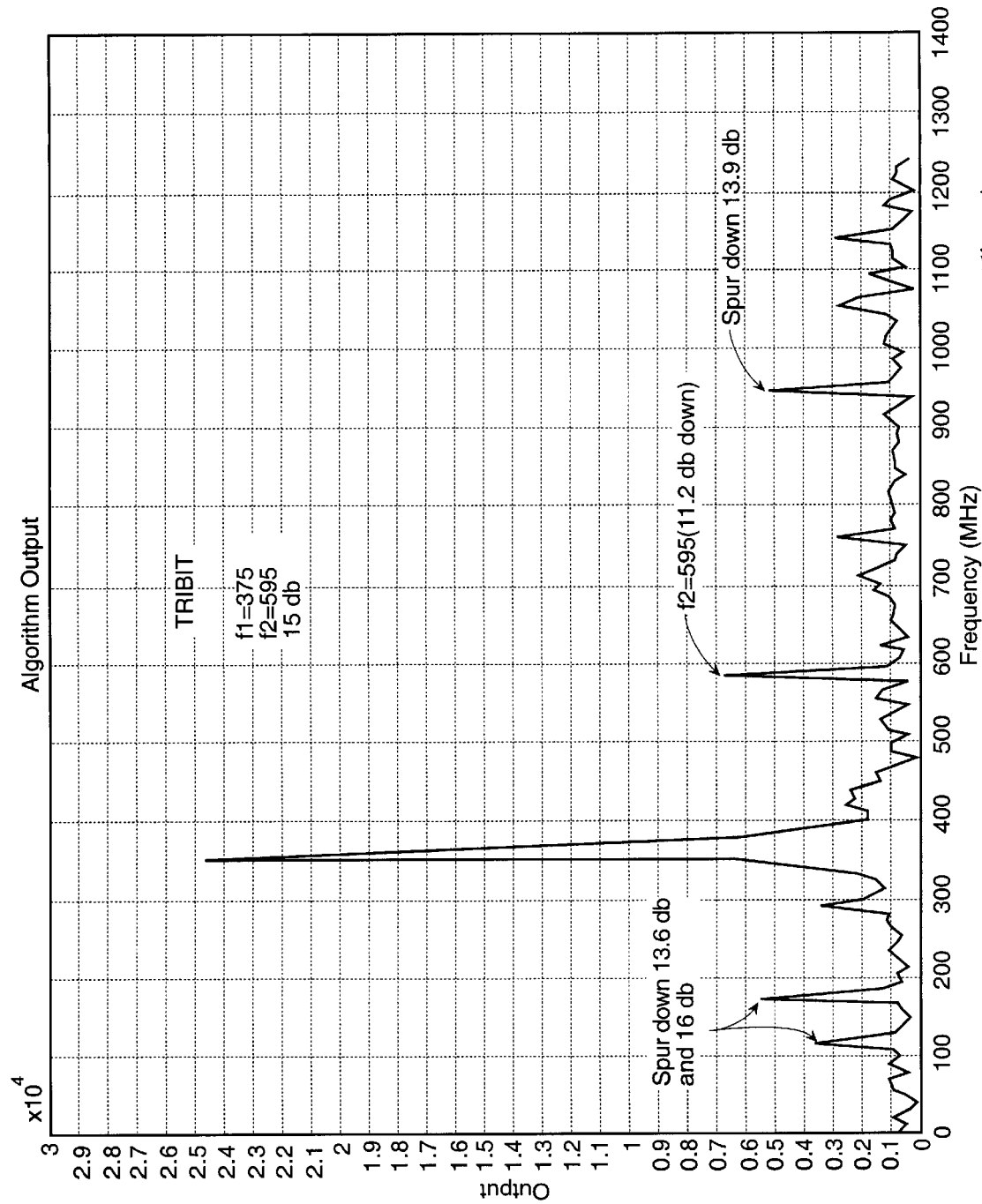
FIG. 7 shows a simulated tribit receiver response to a pair of input signals.

FIG. 6 shows a tribit receiver (including the Kernel function approximation of FIG. 2 herein) responding to a single signal located at 375 megahertz. In this instance, the spurious response at about 945 megahertz is 14 dB below the main signal in amplitude and acceptable receiver response is indicated. The FIG. 6 spurious responses are in general lower as is expected. FIG. 7 shows the tribit receiver response to an input of the of the 595 megahertz and 375 megahertz two signals. In this instance the second signal output is 15 dB below the main signal and at the output of the receiver the second weaker signal at 595 megahertz is about 2.8 dB above the level of the spurious signal and therefore is detectable. This is hence an improvement over the monobit receiver and an acceptable though marginal receiver performance.

In view of the preceding discussion both the underlying algorithm of the present invention and the signal performance of a receiver using the present invention new Kernel function approximation may now be appreciated. To these ends one of the approximated value Kernel functions espoused in the present invention is shown in graphic form in FIG. 8 of the drawings herein. This approximated value Kernel function contains 16 value points disposed in a rectangular pattern and dispersed at several differing angles about the origin of the real/imaginary coordinate axis set 800. The real and imaginary magnitudes at each of these 16 value points are various combinations of the magnitudes 1 and 2 altogether taken in plural combinations of order and sign.

Figures 8, 9:
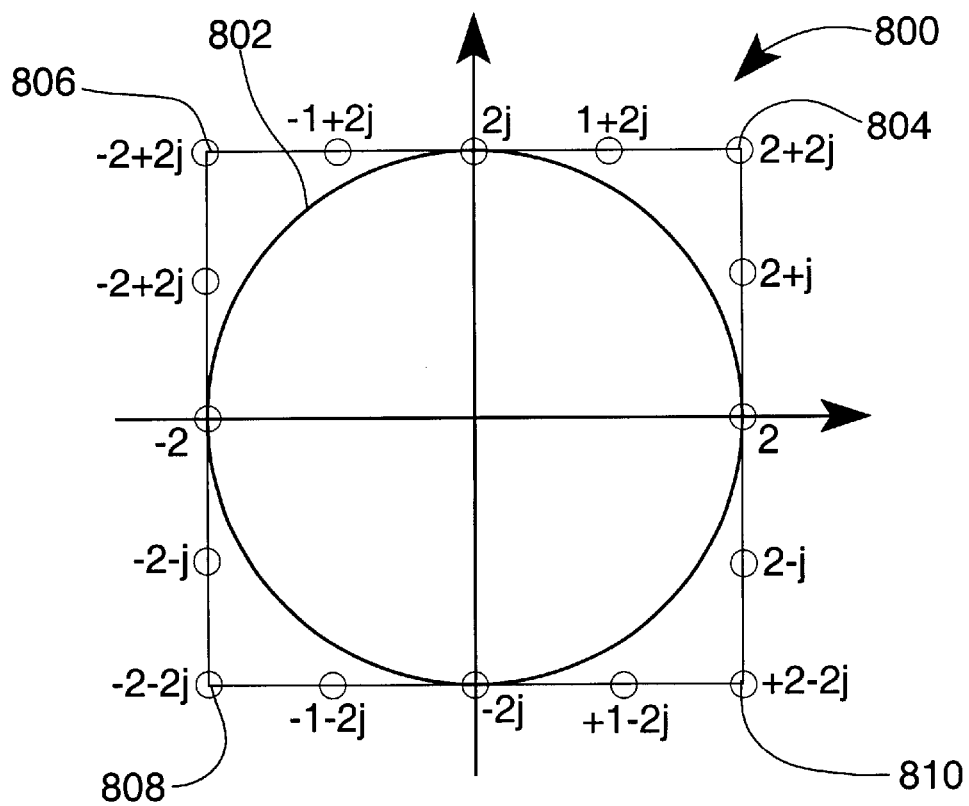
FIG. 8 shows a sixteen-point simplified multiplication Kernel function approximation according to the present invention.
FIG. 9 shows examples of binary shift simplified multiplication.

The magnitude of 2 appearing in a set of Kernel function values such as in FIG. 8 of course requires the use of multiplication in its utilization. When complex numbers representing successive instantaneous values of input signal are to be combined with the Kernel function values shown in FIG. 8, to perform the Fourier transformation operation, it is necessary to use some form of full-fledged genuine multiplication in order to combine the instantaneous signal magnitude with the Kernel function magnitude of 2. In a binary system, however, multiplication by the binary number 2 can be accomplished with speed and simplicity merely through the use of a bit-shifting algorithm. The following examples and FIG. 8 in the drawings demonstrate this concept.

As shown in the tables of FIG. 9 in the drawings the number 3 can be represented by 0011 in a binary number system. If this number 3, is multiplied by the number 2, the resulting product is 6, which can be represented in binary by 0110. By inspection this multiplication operation may also be achieved by shifting the binary bits of the input number 3 or 0011 to the left by one bit position. Similarly, if the number 3 is multiplied by the number 4 (i.e., by 2 then the result by two again) the result is the number 12, which can be represented in binary form by 1100. Thus this operation can also be achieved by shifting—i.e., by shifting the binary bits for the input number 3 leftward by two positions as is shown in FIG. 9 of the drawings herein.

The shifting of binary bits in these fashions can be accomplished very easily and quickly in an implemented binary processing operation. Such easily accomplished shifting provides the underlying basis for use of the ostensibly more complex fast Fourier transform Kernel function approximations shown in the FIG. 8 drawing herein. More precisely, this easily accomplished shifting provides a simply implemented arrangement for accommodating the magnitudes of two appearing in the FIG. 8 Kernel function approximations in a multiplication—an arrangement that is comparable to the previous use of Kernel function values of unity in its implementation simplicity. Thus, with the combined employment of unity values and shift implemented multiplications by two each of the Kernel function values shown in the FIG. 8 drawing become available for present invention usage in for example an electronic warfare receiver.

Additional information regarding bit shifting accomplished multiplication appears in numerous technical documents. For example the U.S. Pat. No. 3,730,425 of J. L. Kindell et al. discloses a multiplication arrangement involving the use of bit shifting. Similarly the U.S. Pat. No. 4,064,400 of I. Y. Akushsky et al. discloses a multiplication arrangement involving the use of bit shifting. The references identified in these patents, particularly the publication references, disclose additional details regarding multiplication accomplished by bit shifting. The multiplication implications of bit shifting are also discussed in textbooks treating the subject of digital computer design, see for example the text "Logical Design of Digital Computers" by Montgomery Phister Jr., John Wiley & Sons, ©1958, page 292 and the text "Digital Computer Fundamentals" by Thomas C. Bartee, McGraw-Hill Incorporated, ©1960, 1966, 1972, page 225. The contents of each of these patents, each patent reference document and each of these textbooks is hereby incorporated by reference herein.

Figure 10:
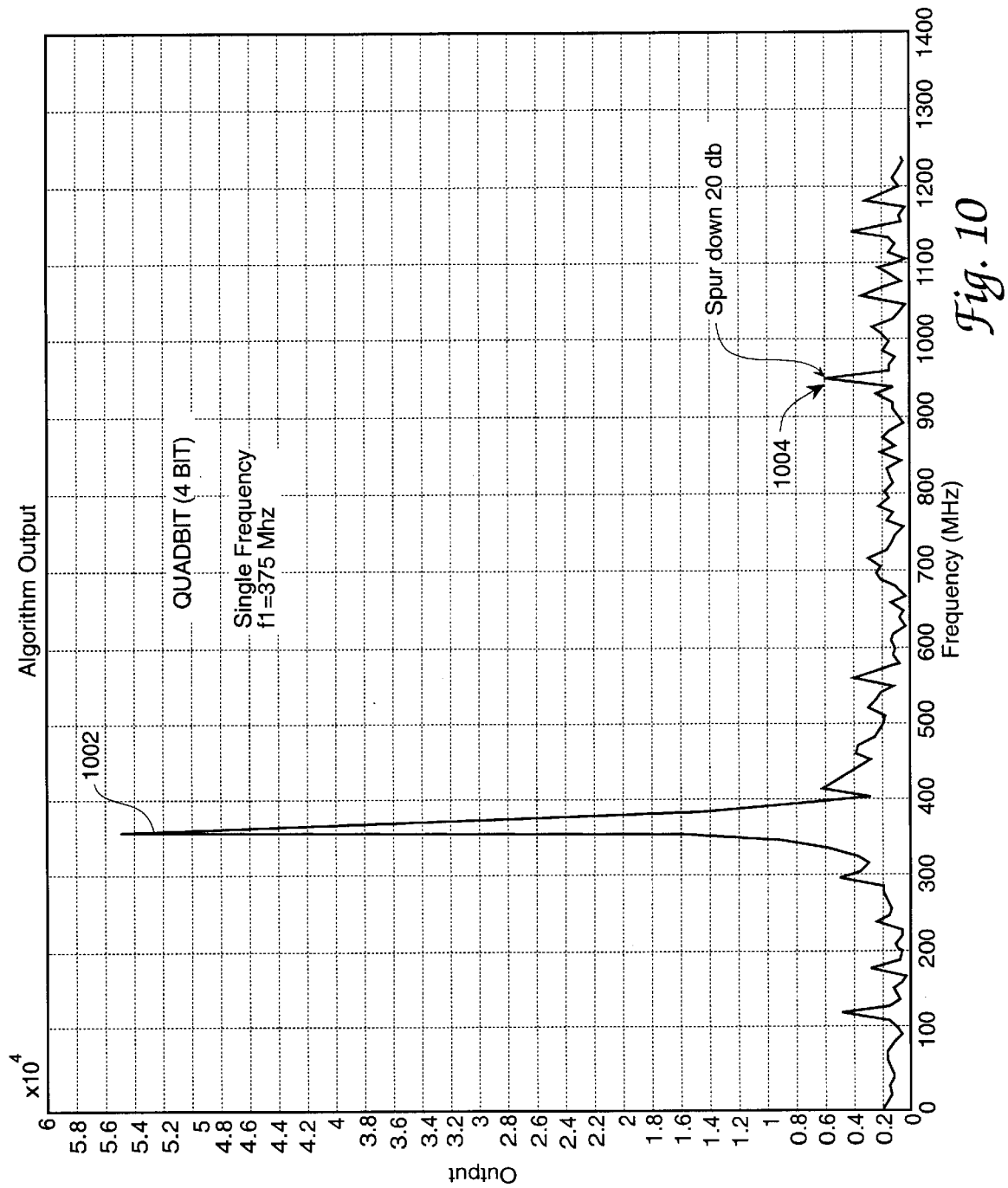
FIG. 10 shows single signal performance of a sixteen point simplified multiplication Kernel function quadbit receiver.
Figure 11:
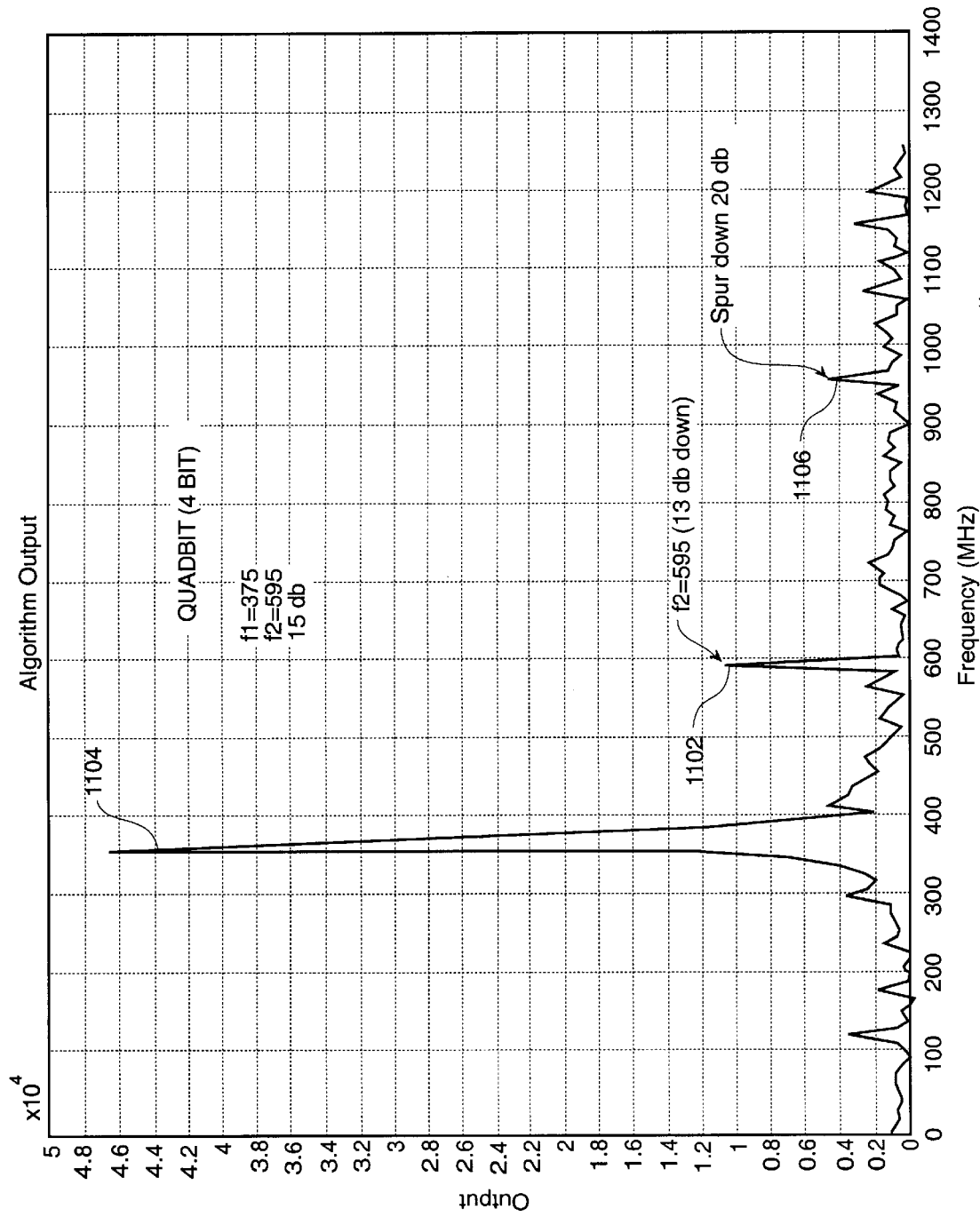
FIG. 11 shows dual signal performance of a sixteen point simplified multiplication Kernel function quadbit receiver.

The performance of a quadbit receiver made in accordance with FIG. 8 and other aspects of the present invention has been evaluated through simulated data and the results are shown in the drawing of FIG. 10 herein. In this drawing, the primary Fourier transformation output resulting from input of a single 375 megahertz signal appears at 1002 and a spurious response attributable to use of the approximated Kernel function appears at 1004. In this instance, the spurious output signal is about 20 dB down in magnitude with respect to the primary signal. This is an improvement of about 10 dB over the results achieved with the monobit receiver and about 6 dB of improvement over the results achieved with the tribit receivers. FIG. 11 in the drawings shows the results of a two-signal input condition for the FIG. 10 quadbit receiver. In this instance the second input signal, i.e., the 595 megahertz signal responsible for the Fourier transformation output signal at 1102, has an input magnitude that is 15 dB below that of the main 375 megahertz input signal. At the output of the quadbit receiver this 595 megahertz second signal has a magnitude that is 13 dB less than that of the main 375 megahertz signal at 1104 and about 7 dB above the magnitude of the spurious signal of about 950 megahertz frequency at 1106. These amplitude differences provide signal segregations that are sufficient for easy separation and detection in receiver circuitry.

It may be helpful in view of the above recital of receiver types in the monobit family to recall that a receiver made in accordance with the first of the above-identified patents, i.e. the U.S. Pat. No. 5,917,737 patent of Tsui et al., can be formally identified as a monobit receiver in view of its use of Kernel function approximations having only the values of 0 and 1 i.e., values expressible in the form of a single binary digit, a monobit. Similarly the receivers disclosed in the later Ser. No. 09/944,616 and Ser. No. 10/008,476 applications, in view of their use of more elaborate Kernel function approximation values, values requiring three binary bits for their representation, may be identified as tribit receivers. Moreover, receivers employing the Kernel function approximations of the present invention may be identified as quadbit receivers in view of the 12 or 16 point Kernel functions involved.

In addition to the FIG. 11 described frequency response characteristics of a quadbit receiver using the present Kernel function approximations the instantaneous dynamic range achieved by the quadbit receiver is about 10 dB better than that of the monobit receiver. Testing results for the quadbit receiver show an instantaneous dynamic range of at least 15 dB.

Figure 15:
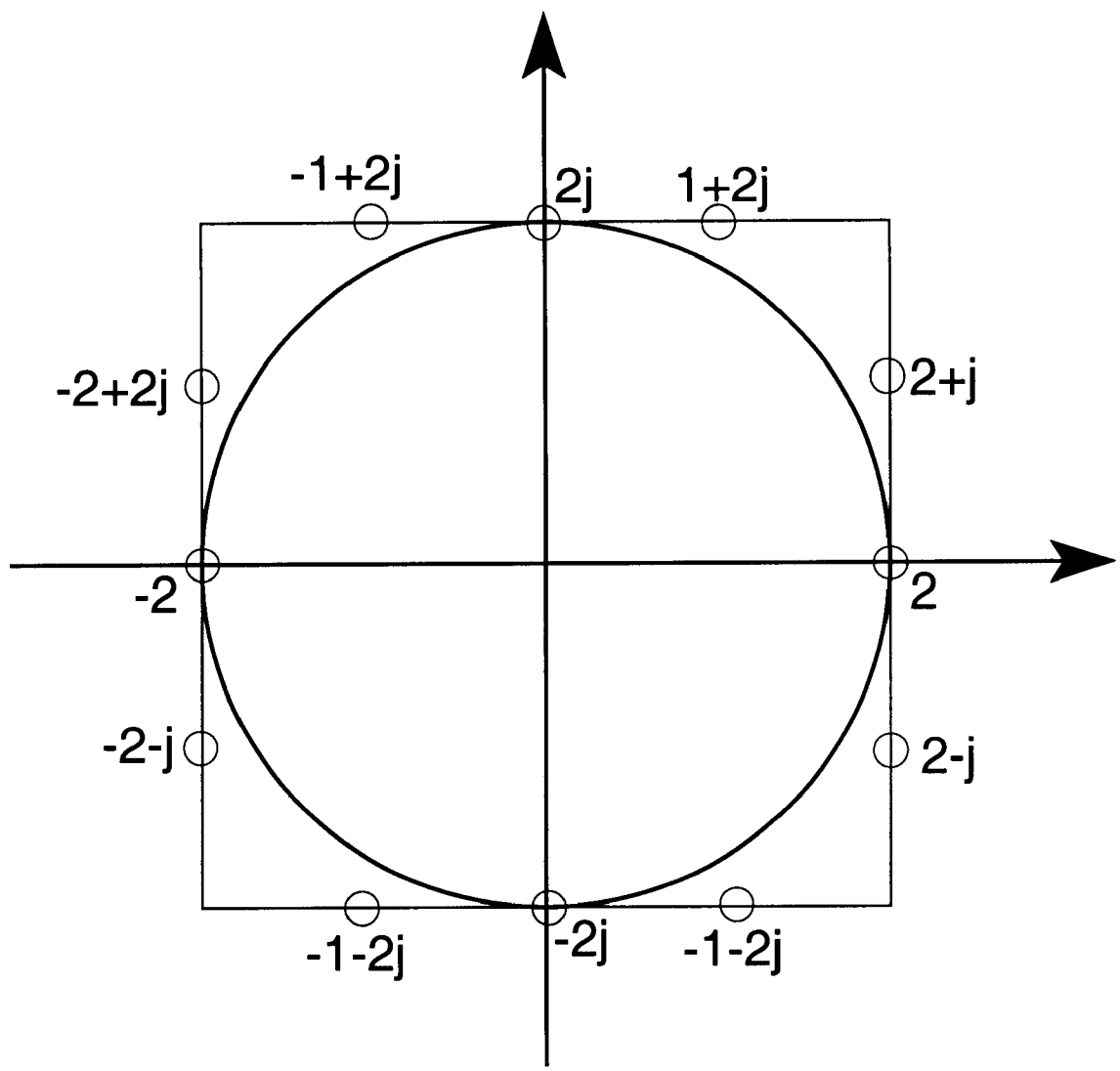
FIG. 15 shows a twelve-point simplified multiplication Kernel function approximation according to the present invention.

A second Kernel function approximation of interest in the present invention is shown in the graphic form of FIG. 8 in FIG. 15 of the drawings herein. The FIG. 15 Kernel function values are identical to those appearing in the FIG. 8 drawing, with the exception of the four corner values appearing at 804, 806, 808 and 810 in FIG. 8, the values involving real and imaginary components each of magnitude 2, having been omitted in the FIG. 15 Kernel function approximation. This omission of four values provides a Kernel function approximation of 12 values in FIG. 15. One suggestion or justification for use of the FIG. 15 set of Kernel function approximation values lies in the fact that the omitted four corner values are those lying the greatest distance from the circle of radius 2, the circle appearing at 802 in the FIG. 8 drawing. This greater distance of the omitted corner values from the circle suggests these values may be the most influential in generating spurious responses and other errors in the Fourier transformation output achieved with the approximations. This suggestion appears to be borne out by the results recited below.

Figure 16:
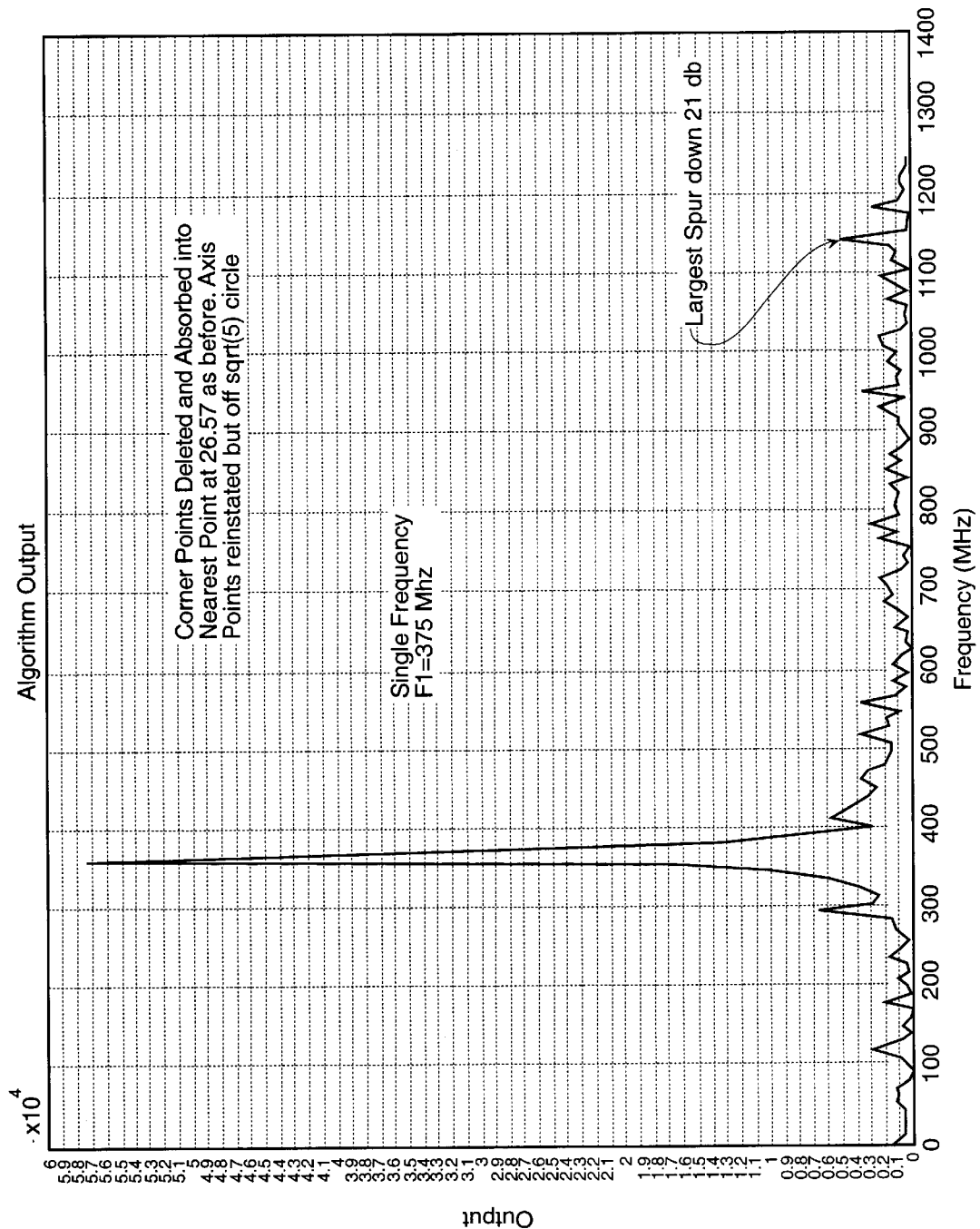
FIG. 16 shows single signal performance of a twelve-point simplified multiplication Kernel function quadbit receiver.
Figure 17:
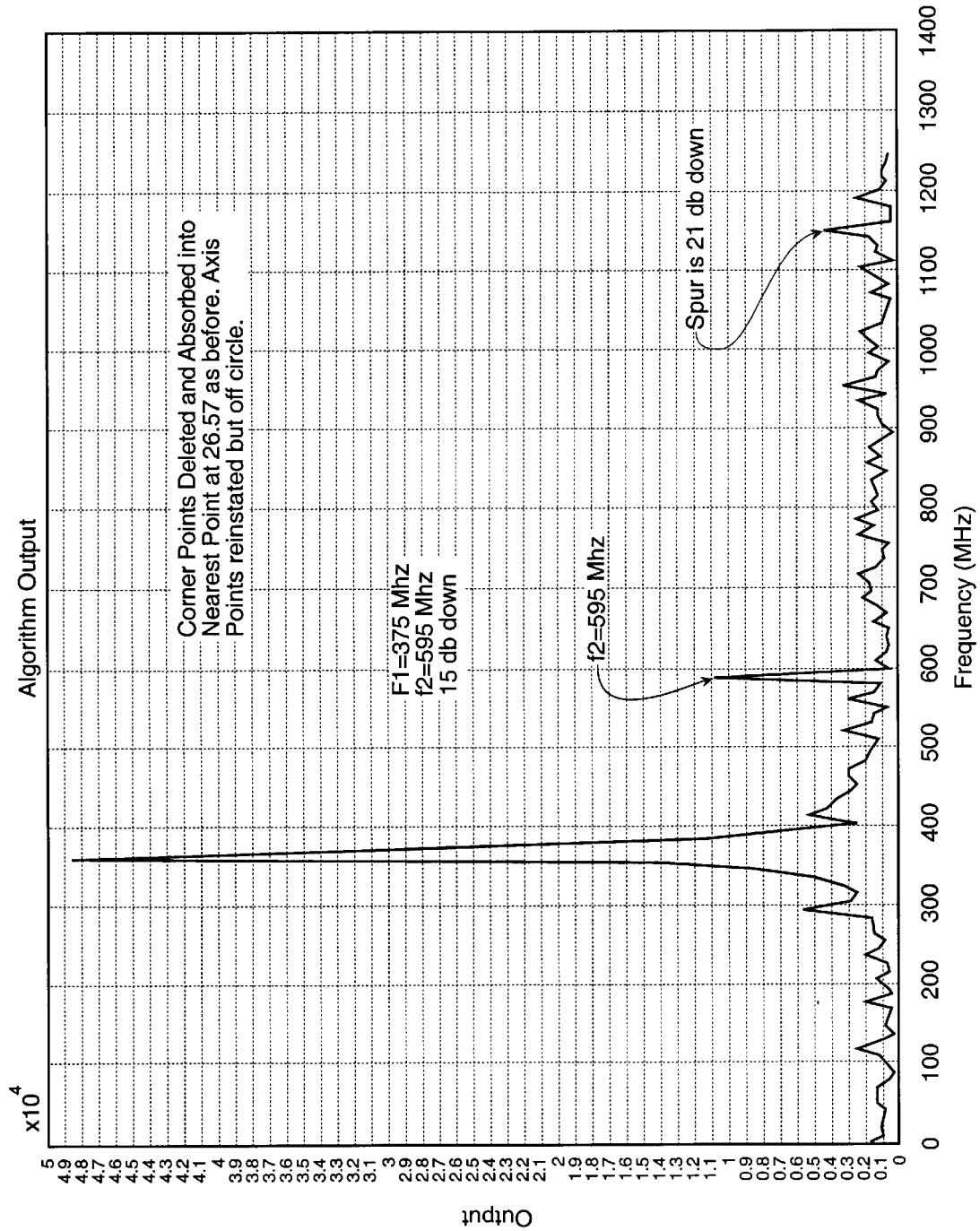
FIG. 17 shows dual signal performance of a twelve-point simplified multiplication Kernel function quadbit receiver.

Use of the FIG. 15 Kernel function approximation values in single signal and two signal simulations of the type leading to the FIG. 10 and FIG. 11 drawings herein provides the results shown in the respective FIG. 16 and FIG. 17 drawings. As may be observed by comparing the similar drawings in these pairs, the spurious response is attenuated by about one additional dB with respect to the primary response in each of the one signal and two signal cases with use of the FIG. 15 reduced number of Kernel function approximation values. Although the increase in signal separation between desired and spurious signal magnitudes is desirable and helpful with respect to circuitry used to select the desired output signals from an electronic warfare receiver, for example, the direction of the change from reducing the number of Kernel function approximation values is considered to be of greatest interest and perhaps surprise here; i.e., an approximated Kernel function simplification has provided better results.

Figure 12:
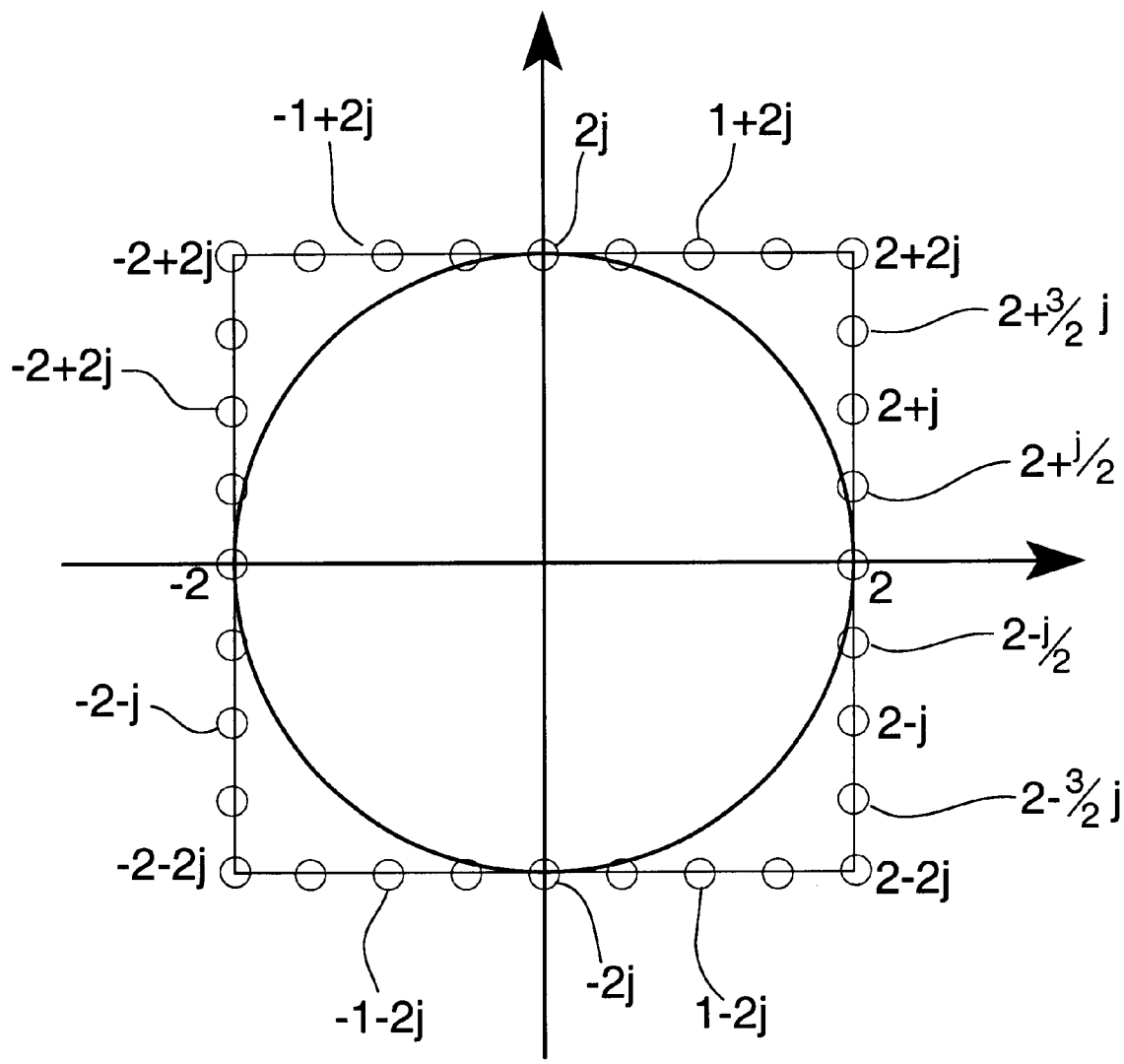
FIG. 12 shows a thirty-two point simplified multiplication Kernel function approximation according to the present invention.

A continuation in this line of reasoning suggesting modification of the FIG. 8 Kernel function approximation to obtain the FIG. 15 Kernel function suggests other Kernel function approximations may also be of interest with respect to an electronic warfare radio receiver or other Fourier transformation based systems. Such an additional Kernel function approximation appears in the FIG. 12 drawing herein and represents a movement in the opposite direction from FIG. 15 with respect to the FIG. 8 Kernel function. In FIG. 12 a thirty-two value Kernel function approximation is shown. The real and imaginary component magnitudes used in this FIG. 12 approximation include the previously employed quantities of 1 and 2 and in addition include intervening ½ values. Such intervening half values are of potential interest within the spirit of the present invention in view of the possibility of implementing such values by way of shifting binary bits in the opposite direction from that used in the above discussions i.e., shifting right rather than left during the binary processing. The above identified digital computer textbooks also discuss bit shifting used for such purposes.

Figure 13:
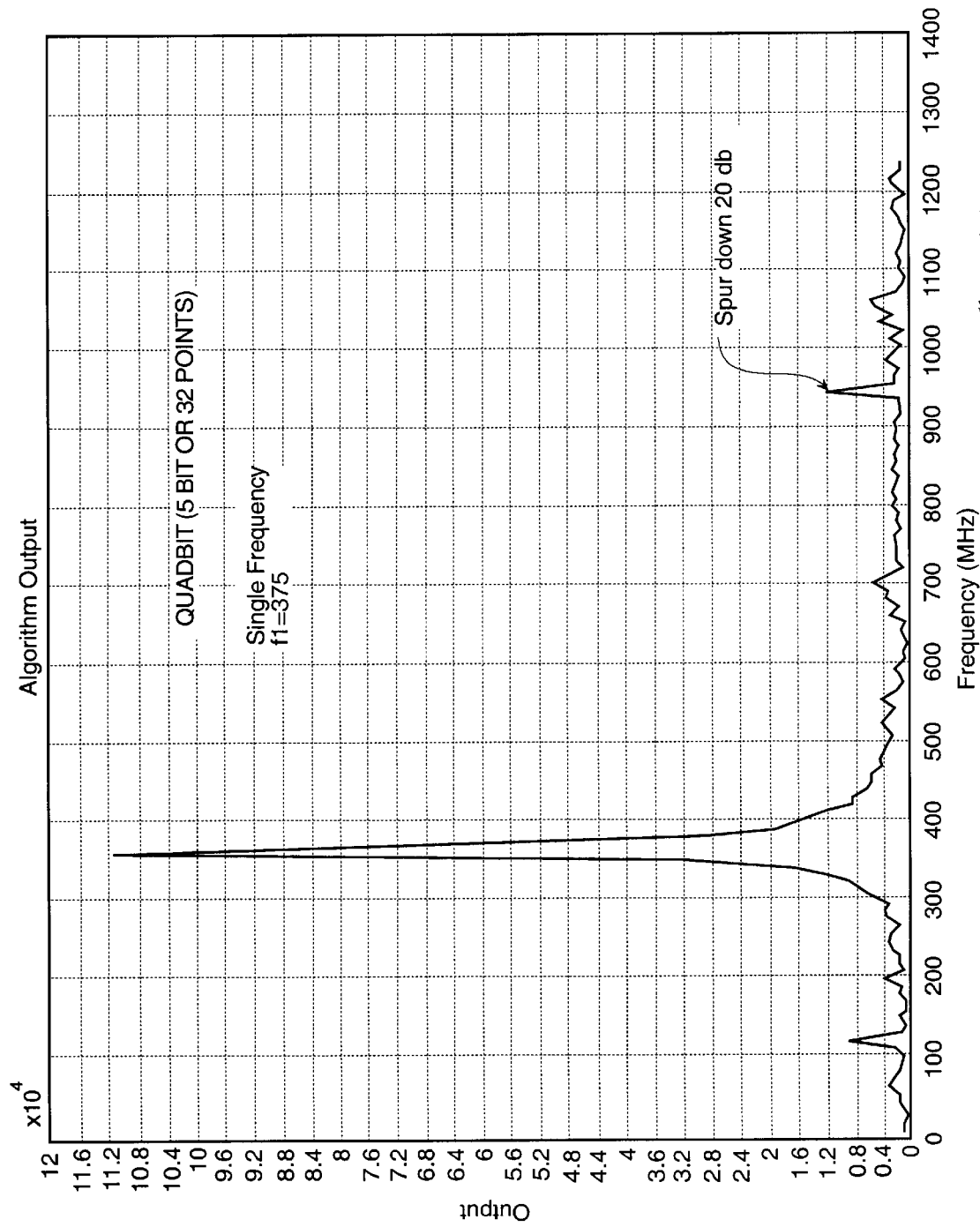
FIG. 13 shows single signal performance of a thirty-two point simplified multiplication Kernel function quadbit receiver.
Figure 14:
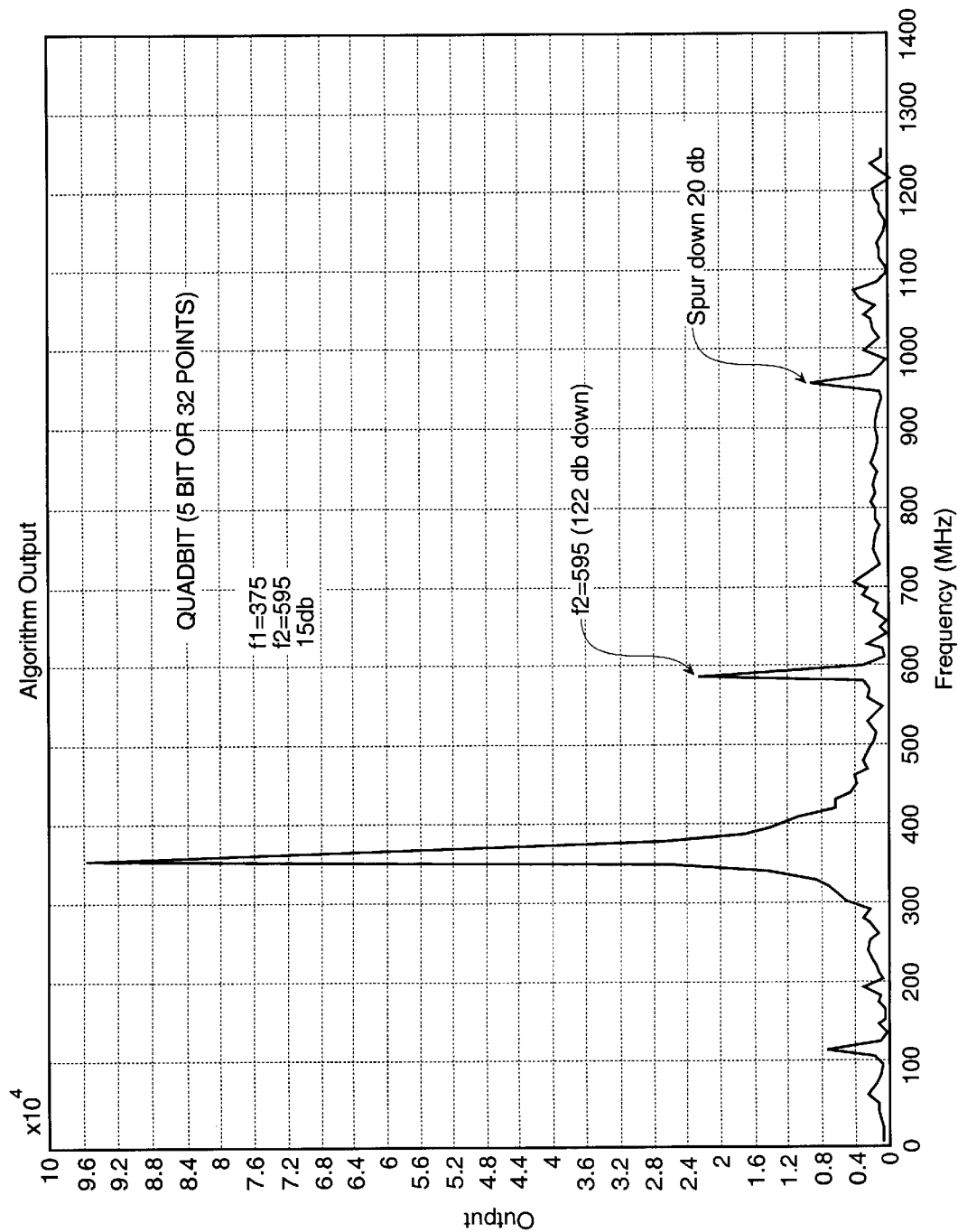
FIG. 14 shows dual signal performance of a thirty-two point simplified multiplication Kernel function quadbit receiver.

FIGS. 13 and 14 in the drawings show the one signal and two signal results obtained with use of the FIG. 12 thirty-two value Kernel function approximation. As may be observed in these drawings, the relationship between main signal and spurious signal responses is substantially the same as that achieved with the FIG. 8 Kernel function approximation when the FIG. 12 Kernel function approximation is tested. These results in fact suggest the FIG. 15 improvement to the FIG. 8 Kernel function approximation provides the most optimum Fourier transformation results to be expected with the current line of approximated Kernel function values.

While the apparatus and method herein described constitute a preferred embodiment of the invention, it is to be understood that the invention is not limited to this precise form of apparatus or method and that changes may be made therein without departing from the scope of the invention which is defined in the appended claims.

We claim:

1. The limited complexity method of analyzing input radio frequency signals, said method comprising the steps of:

generating an approximated Fourier transformation of successive segments of said input radio frequency signals;

said approximated Fourier transformation including individual Fourier series terms having real magnitude and imaginary magnitude coefficients generated by multiplication of input signal determined coefficients by selected approximated Fourier transformation Kernel function coefficients;

said selected approximated Fourier transformation Kernel function coefficients having magnitudes of unity and of two raised to an exponential power;

generating said individual Fourier series terms from said input signal determined coefficients and from said Fourier transformation Kernel function coefficients having real magnitude and imaginary magnitude coefficients of two raised to an exponential power using a bit shift multiplication algorithm; and discriminating between spurious, approximated Fourier transformation-sourced and valid, input signal sourced components in a Fourier transformation output signal.

2. The limited complexity method of analyzing input radio frequency signals of claim 1 wherein said analyzing comprises determining input signal component frequency and component amplitude contents of radio frequency input signals of an electronic warfare radio receiver.

3. The limited complexity method of analyzing input radio frequency signals of claim 2 wherein said coefficients of two raised to an exponential power, in said step of generating said individual Fourier series terms from said input signal determined coefficients and from said Fourier transformation Kernel function coefficients having real magnitude and imaginary magnitude coefficients of two raised to an exponential power, is two raised to one of a first, a second and a third exponential power.

4. The limited complexity method of analyzing input radio frequency signals of claim 3 wherein said bit shift multiplication algorithm is a hardware-resident algorithm.

5. The limited complexity method of analyzing input radio frequency signals of claim 3 wherein said bit shift multiplication algorithm is a software-resident algorithm.

6. The limited complexity method of analyzing input radio frequency signals of claim 2 further including the step of:

generating said individual Fourier series terms from said input signal determined coefficients and from said Fourier transformation Kernel function coefficients having real magnitude and imaginary magnitude coefficients of unity using a multiplication by one algorithm having equal input and output signals.

7. The limited complexity method of analyzing input radio frequency signals of claim 1 wherein said approximated Fourier transformation Kernel function is comprised of sixteen Kernel function values each comprised of real and imaginary coefficients having one of the combinations of magnitude one with magnitude two and magnitude two with magnitude two.

8. The limited complexity method of analyzing input radio frequency signals of claim 7 wherein said real and imaginary coefficients include multiple positive and negative algebraic sign combinations.

9. The limited complexity method of analyzing input radio frequency signals of claim 1 wherein said approximated Fourier transformation Kernel function is comprised of twelve Kernel function values each comprised of real and imaginary coefficients of magnitude one and two and having multiple positive and negative algebraic sign combinations.

10. The limited complexity method of analyzing input radio frequency signals of claim 2 wherein said step of discriminating between spurious, approximated Fourier transformation-sourced and valid, input signal sourced Fourier series terms in a Fourier transformation output signal includes a signal amplitude discriminating step.

11. The limited complexity method of analyzing input radio frequency signals of claim 1 wherein said input radio frequency signals are two in number and are of five decibels difference in signal strength.

12. The limited complexity method of analyzing input radio frequency signals of claim 1 wherein said input radio frequency signals are two in number and are of ten decibels difference in signal strength.

13. Approximated Kernel function utilization apparatus comprising the combination of:

a source of multiple frequency signals to be evaluated for signal frequency and signal amplitude contents; and an implemented Fourier transformation algorithm connected with said source of multiple frequency signals;

said implemented Fourier transformation algorithm including a selected plurality of approximated Fourier transformation Kernel function coefficient values having unity and powers of two real and imaginary coefficient magnitudes; and said implemented Fourier transformation algorithm including a bit shift multiplication arrangement disposed to perform multiplication operations involving said powers of two Kernel function coefficient values in said approximated Fourier transformation.

14. The approximated Kernel function utilization apparatus of claim 13 wherein said apparatus comprises a portion of an electronic warfare microwave radio frequency radio receiver.

15. The approximated Kernel function utilization apparatus of claim 13 wherein said source of multiple frequency signals comprises two differing radio frequency signals.

16. The approximated Kernel function utilization apparatus of claim 13 wherein each of said approximated Fourier transformation Kernel function coefficient values comprise one of twelve real coefficient magnitudes together with twelve imaginary coefficient values; and sixteen real coefficient magnitudes together with sixteen imaginary coefficient values.

17. The approximated Kernel function utilization apparatus of claim 13 wherein said implemented Fourier transformation algorithm further includes a unity multiplier disposed to perform multiplication operations involving said unity real and imaginary coefficient magnitudes in said approximated Fourier transformation.

18. The approximated Kernel function utilization apparatus of claim 13 wherein said implemented Fourier transformation algorithm is comprised of electronic hardware components.

19. Fourier transformation radio receiver apparatus comprising the combination of:

a microwave radio frequency radio receiver circuit having an embodied Fourier transformation frequency segregation algorithm included therein;

said embodied Fourier transformation frequency segregation algorithm including a plurality of approximation Fourier transformation Kernel function values of selected real component and imaginary component magnitudes and of differing angular dispersions about an origin point of a real and imaginary coordinate axis graph;

said transformation Kernel function coefficients of selected real component and imaginary component magnitudes including real component magnitudes of unity and powers of two, in selected combination with imaginary component magnitudes of unity and powers of two;

said embodied Fourier transformation frequency segregation algorithm also including a bit shift multiplication algorithm responsive to multiplication events inclusive of one of said Kernel function powers of two real component magnitude and said powers of two imaginary component magnitude;

said microwave radio frequency radio receiver circuit further including a final output signal selection algorithm amplitude responsive to a selected plurality of Fourier transformed algorithm output signals.

20. The Fourier transformation radio receiver apparatus of claim 19 wherein:

said plurality of approximation Fourier transformation Kernel function values comprise one of sixteen Kernel function values and twelve Kernel function values; and said transformation Kernel function coefficients of selected real component and imaginary component magnitudes include real component magnitudes of unity and first power of two, in selected combination with imaginary component magnitudes of unity and first power of two.

* * * * *